United States Patent [19]

Fukami et al.

[11] Patent Number: 4,857,997
[45] Date of Patent: Aug. 15, 1989

[54] COLOR TELEVISION CAMERA INCORPORATING A COLOR RESOLVING PRISM SYSTEM

[75] Inventors: Kiyoshi Fukami, Yokohama; Takeshi Sekiguchi; Shigeru Ohshima, both of Tokyo, all of Japan

[73] Assignee: Canon Kabushiki Kaisha, Tokyo, Japan

[21] Appl. No.: 186,654

[22] Filed: Apr. 19, 1988

Related U.S. Application Data

[63] Continuation of Ser. No. 639,143, Aug. 9, 1984, abandoned.

[30] Foreign Application Priority Data

Aug. 17, 1983 [JP] Japan ................................. 58-149759
Aug. 17, 1983 [JP] Japan ................................. 58-149760

[51] Int. Cl.$^4$ ..................... H04N 9/097; G02B 27/14
[52] U.S. Cl. ......................................... 358/55; 350/173
[58] Field of Search ........................... 358/55; 350/173

[56] References Cited

U.S. PATENT DOCUMENTS 3,932,027  1/1976  Cook et al. .......................... 350/173
4,236,177 11/1980  Ohshima et al. ..................... 358/55
4,262,305  4/1981  Sekiguchi et al. .................... 358/55

OTHER PUBLICATIONS

T. Katsuta et al., "New Type Color TV Camera with Improved Optical System", *Colloque International sur la Television en Couleur-Aspects Scientifiques et Techniques*, Paris, Mar. 25-29, 1968, pp. 1-16.
W. E. Turk, "A Review of Television Camera Tubes", *English Electric Journal*, vol. 23, No. 5, Sep./Oct. 1968, pp. 34-39.
D. W. Tenquist et al., *University Optics*, vol. 1, Iliffe Books Ltd., London, 1969, pp. 119-120.
L. W. Germany et al., "Reflections of a Camera Designer", New Camera Technology and Digital Techniques-Television Technology in the 80's, pp. 89-103.

*Primary Examiner*—James J. Groody
*Assistant Examiner*—Randall S. Svihla
*Attorney, Agent, or Firm*—Fitzpatrick, Cella, Harper & Scinto

[57] ABSTRACT

In a television camera having a color resolving prism system for forming monochromatic images on the image pickup surfaces of a plurality of image pickup devices by an objective lens the color resolving prism system has first, second, third and fourth prisms as is named in the order from a side of the objective lens along the optic axis of the objective lens, the first and second prisms, with their refracting angles opening in opposite directions, are edisposed with an air layer interposed therebetween or are joined together with a dichroic layer interposed therebetween, the second and third prisms are disposed with an air layer interposed therebetween, the third and fourth prisms are joined together with a second dichroic layer interposed therebetween, and the values of the refracting angles of the first $\theta_{10}$ or $\theta_{21}$), second $\theta_{10}+\theta_{11}$ or $\theta_{22}$, third $\theta_{23}$ and fourth $\theta_{24}$ prisms satisfy the following conditions:

(1) in the case where the first and second prisms are disposed with the air layer interposed therebetween, $$5.2° < \theta_{10} < 12°$$

$$26.7° < \theta_{10}+\theta_{11} < 30°, \text{ and}$$

(2) in the case where the first and second prisms are joined together with the dichroic layer interposed therebetween, $$25.8° \leq \theta_{21} \leq 30°$$

$$18° \leq \theta_{22} \leq 20°$$

$$28.1° \leq \theta_{23} \leq 35.4°$$

$$24 = -\theta_{21}+\theta_{22}+\theta_{23}.$$

5 Claims, 4 Drawing Sheets

COLOR TELEVISION CAMERA INCORPORATING A COLOR RESOLVING PRISM SYSTEM

This application is a continuation of application Ser. No. 639,143 filed on Aug. 9, 1984 now abandoned.

BACKGROUND OF THE INVENTION

1. Field of the Invention

This invention relates to a color television (TV) camera, and more particularly to a color resolving prism system positioned between an objective lens and the focal plane of the objective lens for color-resolving the light beam from an object to be photographed.

2. Description of the Prior Art

In a color TV camera, a color resolving prism system is disposed behind an objective lens, and the incident light beam is resolved into three color wavelength ranges and imaged on three image pickup elements corresponding to the respective wavelength ranges. Each image pickup element scans on the imaging plane and converts the image into an electrical signal.

Light weight and compactness are required as much as possible of these color TV cameras, particularly hand-held color TV cameras for collecting news, and therefore, it has been practiced to make the image size small and make the color resolving prism system and image pickup elements compact.

For example, the image pickup tube converts the energy of light arriving at the light-receiving surface into an electric current by scanning of an electron beam and obtains an output signal. Accordingly, when the image size is made small and an objective lens of the same F-number is used, if the same object to be photographed is photographed, the energy of light per unit area on the light-receiving surface is the same, but the cross-sectional area of the beam becomes smaller in proportion to the image size and therefore the output current decreases. This means that sensitivity is reduced if the image size is made smaller. Accordingly, to avoid a reduction in sensitivity, it is necessary to make the F-number of the objective lens smaller with the reduction in the size of the picture plane and make the energy of light arriving at the light-receiving surface great to thereby eliminate any reduction in the output current.

However, in a color resolving prism comprised of three prisms, an F-number of about 1.4 has been the limit and it has been difficult to make the aperture opening great.

Problems will first be illustrated by reference to an example of the prior art shown in FIG. 1 of the accompanying drawings. The imaged light beam emerging from an objective lens 4 enters a first prism from the entrance surface 1' of the color resolving prism system and for example, only the blue range light thereof is reflected by a surface 1" provided with a dichroic film and is further totally reflected by the entrance surface 1', whereafter the unnecessary wavelength component thereof is cut by a trimming filter 6B, and then the light beam is imaged on the light-receiving surface 5B' of an image pickup element 5B.

The light beam transmitted through the dichroic surface 1" enters a second prism 2 and for example, only the red range light thereof is reflected by a surface 2" provided with a dichroic film and is further totally reflected by the boundary surface 2' with a parallel air gap provided between the first prism 1 and the second prism 2, and the unnecessary wavelength component thereof is cut by a trimming filter 6R, and then the light beam is imaged on the light-receiving surface 5R' of an image pickup element 5R. The light beam transmitted through the dichroic surface 2", for example, the green range light, passes through a prism 3 and the unnecessary wavelength component thereof is cut by a trimming filter 6G, and then the light beam is imaged on the light-receiving surface 5G' of an image pickup element 5G. The shapes of the prisms are determined by the specifications such as the refractive index n of the glass material and the F-number ($F_{no}$) desired. If, as shown in FIG. 1, the angles formed between the light entrance surface 1' of the first prism 1 and the dichroic surface 1", and between the light entrance surface 2' of the second prism 2 and the dichroic surface 2" are $\theta_1$ and $\theta_2$ and the angle formed between the light entrance surface of the third prism system 3 and the light exit surface 3" of the thrid prism system 3 is $\theta_3$, these angles must satisfy the following conditions:

$$\theta_1 \leq \sin^{-1}(1/n) - \sin^{-1}(1/(2nF_{no})) \quad (3)$$

$$2\theta_1 \geq \sin^{-1}(1/n) + \sin^{-1}(1/(2nF_{no})) \quad (4)$$

$$2\theta_2 \geq \theta_1 + \sin^{-1}(1/n) + \sin^{-1}(1/(2nF_{no})) \quad (5)$$

$$\theta_3 = \theta_2 - \theta_1 \quad (6)$$

Condition (3) is necessary in order that the wavelength range light to be transmitted through the dichroic surface 1" may not be totally reflected by the surface 1", condition (4) is necessary in order that the wavelength range light reflected by the dichroic surface 1" may be totally reflected by the surface 1', condition (5) is necessary in order that the wavelength range light reflected by the dichroic surface 2" may be totally reflected by the surface 2', and condition (6) is necessary in order that the entrance surface 1' and the exit surface 3" may be parallel to each other.

It is to be noted that the angle formed between the light entrance surface of the first prism 1 and the dichroic surface, i.e., the angle $\theta_1$ formed between a plane perpendicular to the optic axis and the dichroic surface 1", the range in which the angle $\theta_1$ can exist is determined by the refractive index n of the glass material and the F-number desired in accordance with conditions (3) and (4).

FIG. 2 of the accompanying drawings shows this fact and also shows the relation between the F-number and the angle $\theta$ with the refractive index n of the glass material as the parameter. It can be seen from this graph that the range of the angle $\theta_1$ which satisfies conditions (3) and (4) at a time is limited to a range in which the F-number is greater than 1.4, irrespective of the refractive index n of the glass material. That is, in a color resolving prism system comprised of three prisms, an F-number of 1.4 is the limit, whereby even if a bright lens having a wide aperture opening is used, regular reflection and total reflection do not take place and therefore a predetermined color resolving action is not executed.

As described above, in a color resolving prism of the conventional type, only objective lenses of up to F-number 1.4 can be used, and this has led to a disadvantage that reduction in sensitivity is unavoidable if the image is made smaller and the camera is made compact.

In contrast, a method of alleviating the limit of the brightness of a color resolving prism system comprised of three prisms is announced in "New Camera Technology and Digital Technique, Television Technology in the 80's".

That is, in the conventional color resolving prism system as is shown in FIG. 1, the entrance surface of the first prism is inclined by an angle $\theta_{10}$ in the direction of a side opposite to the dichroic surface 1″ and to make the entrance surface and the exit surface 3″ of the color resolving prism system parallel to each other, a wedge-shaped prism 10 having a refracting angle $\theta_{10}$ is provided in front of the first prism 1 with a parallel air space interposed therebetween, and thus the system of FIG. 3 is attained. In this case, the aforementioned condition (4) is modified as follows:

$$2\theta_{11}+\theta_{10} \geq \sin^{-1}(1/n)+\sin^{-1}(1/(2nF_{no})) \therefore 2\theta_{11} \geq \sin^{-1}(1/n)+\sin^{-1}(1/(2nF_{no})) \quad (4)'$$

This corresponds to the fact that curve (4) in FIG. 2 is lowered by $\theta_{10}/2$ to become curve (4′) and the point of intersection between curve (4) and curve (3) moves to the left, i.e., in the direction in which the F-number becomes smaller. In this novel color resolving optical system comprising four prisms, a color resolving prism in which an objective lens whose F-number is smaller than 1.4, for example, F-number 1.2, is usable.

U.S. Pat. Nos. 4,236,177 and 4,262,305 propose a color resolving prism system using four prisms, but the F-number of the specific embodiments described therein is 1.4.

As a result of the inventor's study, it has been found that the arrangement of this color resolving prism system suffers from problems such as an increase in the optical path length of the glass caused by an increase in the number of constituent prisms, bulkiness of the entrance surface resulting from making the F-number smaller, occurrence of a ghost image caused by an increase in the number of surfaces, etc.

SUMMARY OF THE INVENTION

It is an object of the present invention to realize an optical system whose F-number is small.

It is another object of the present invention to prevent the optical system from becoming bulky and prevent any reduction in performance caused by a ghost image.

The invention will become fully apparent from the following detailed description thereof taken in conjunction with the accompanying drawings.

DESCRIPTION OF THE PREFERRED EMBODIMENT

Figure 3:
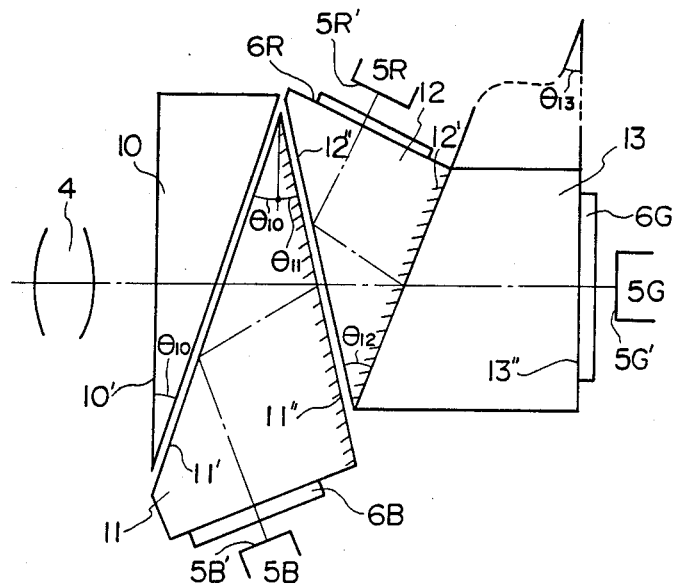
FIG. 3 is a cross-sectional view showing a specific embodiment of the present invention.

The present invention will hereinafter be described in detail by reference to FIG. 3.

The conditions which should be satisfied by $\theta_{10}$, $\theta_{11}$, $\theta_{12}$ and $\theta_{13}$ concerning the refracting angles of prisms are as follows:

$$\theta_{11} \geq \sin^{-1}(1/n)-\sin^{-1}(1/(2nF_{no})) \quad (3)'$$

$$\theta_{11} \geq \sin^{-1}(1/n)+\sin^{-1}(1/(2nF_{no}))-2\theta_{11}+ \quad (4)''$$

$$2\sin^{-1}(1/(2nF_{no})) \leq \theta_{10}+\theta_{11} < 30° \quad (7)$$

But $0 \leq \alpha \leq \tan^{-1}(s/L \cdot n) \quad (8)$ where s is ½ of the dimension of the shorter side of the picture plane, and L is the distance in the air between the exit pupil of the objective lens and the image plane (which will be explained hereinafter).

$$2\theta_{12} \geq \sin^{-1}(1/n)+\sin^{-1}(1/(2nF_{no})) \quad (5)'$$

$$\theta_{13}=\theta_{12}-\theta_{11} \quad (6)'$$

Condition (4)″ has been provided in order that the effective imaged light beam reflected by a dichroic surface 11″ may be totally reflected by the surface 11′, and $\theta_{11}$, $\theta_{12}$ and $\theta$—are similar to those in the conventional system comprising three prisms.

Condition (5) will now be described. From condition (3)′, $$-\theta_{11} \geq -\sin^{-1}(1/n)+\sin^{-1}(1/(2nF_{no})),$$

and from condition (4)″, $$\theta_{10}+2\theta_{11} \geq \sin^{-1}(1/n)+\sin^{-1}(1/(2nF_{no}))+\alpha$$

These two formulas are added to provide formula (7). That is, $$\theta_{10}+\theta_{11} \geq 2\sin^{-1}(1/(2nF_{no}))+\alpha \geq 2\sin^{-1}(1/(2nF_{no})),$$

since $\alpha \geq 0$. Condition (7) represents the minimum value of the refracting angle of the second prism and for example, when n=1.75 and $F_{no}$=1.24≃1.2, $$\theta_{10}+\theta_{11} > 26.64° \simeq 26.7.$$

Figure 4:
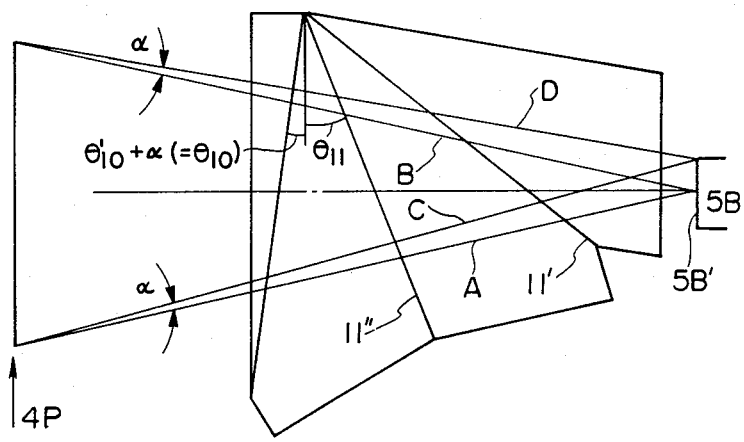
FIGS. 4 and 5 are developed views of an optical member along the optical path.
Figure 5:
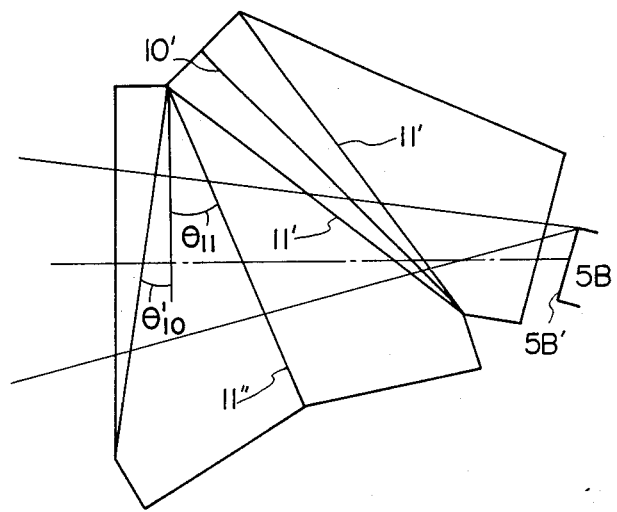

It is desirable that the upper limit be less than 30° to prevent a ghost image and prevent occurrence of shading in the dichroic film. If the upper limit is exceeded, not only will the prism become bulky, but also the occurrence of a ghost image and the occurrence of shading due to the angle of incidence on the dichroic film becoming great will be unavoidable. Accordingly, $$\theta_{10}+\theta_{11} < 30°$$

is set. Also, $\alpha$ included in formulas (4)″ and (8) is the condition for preventing a ghost image from occurring to the primary image formed on the light-receiving surface 5B′. This will hereinafter be described by reference to FIGS. 4 and 5 which are views developed along the optical path of the prism. The light beam imaged on the light-receiving surface 5B′ is regularly reflected by the dichroic surface 11′ as indicated by light rays A and B in FIG. 4 and is totally reflected by the boundary surface 11' with the air gap. However, in the ordinary objective lens, the distance between the exit pupil 4P thereof and the image plane is finite and therefore, for example, the imaged light beam travelling to the upper end of the light-receiving surface 5B' in FIG. 4 passes along routes C and D and becomes inclined with respect to the on-axis imaged light beams A and B. Moreover, this inclination is a direction in which the angle of incidence on the totally reflecting surface 11' becomes smaller. In order to design the optical path length of the glass of the color resolving prism system to be short, each refracting angle is often determined to be a value as small as possible within a range which satisfies conditions (3)', (4)", (5)' and (6)' relative to the on-axis light beams A and B and therefore, the angle of incidence of the light beam A onto the surface 11' often becomes an angle substantially equal to the critical angle. In such a case, the angle of incidence of the light ray C of the light rays travelling to the upper end of the light-receiving surface 5B' onto the surface 11' becomes smaller than the critical angle and part of the light ray is transmitted therethrough. This transmitted light is partly reflected by the entrance surface 10' of a prism 10 as shown in FIG. 5 and becomes a ghost image. (In FIG. 5, the refracting angle has such value $\theta'_{10}+\theta'_{11}$ that the angle of incidence of the light beam C onto the surface 11' is a little smaller than the critical angle). This ghost image is liable to occur when the objective lens is used near its open condition and the object to be photographed includes a bright portion, and moreover it remarkably harms the image because the ghost image is nearly in a focused condition. To avoid such a ghost image, the refracting angle (such increased angle is indicated as $\theta_{10}+\theta_{11}$ in FIG. 4) may be increased so that all of light ray C may be totally reflected by the surface 11', and this increment from $\theta'_{10}$ is $\alpha$. The angle formed between A and C is $\tan^{-1}(S/(L\cdot n))$ at greatest and therefore, $\alpha$ is determined in the range of condition (8).

The condition set on the basis of such a situation is $$5.2° < \theta_{10} < 12° \quad (9)$$

Also, $$n \geq 1.7 \quad (10)$$

is determined to shorten the size of the prism to realizable dimensions.

Further, it is desirable to take the following conditions into consideration to make the designing easy:

$$19° \leq \theta_{11} \leq 22.9° \quad (11)$$

$$33.3° \leq \theta_{12} \leq 37° \quad (12)$$

$$\theta_{13} = \theta_{12} - \theta_{11}$$

where $\theta_{11}$, $\theta_{12}$ and $\theta_{13}$ are the refracting angles of the second, third and fourth prisms, respectively.

If the upper limits of conditions (11) and (12) are exceeded, the prism will become bulky and occurrence of a ghost image cannot be suppressed, and if the lower limits of conditions (11) and (12) are exceeded, it will become extremely difficult to realize a prism system with a small F-number which is the object of the present invention.

Examples of the numerical values which can make the F-number smaller and can also make the optical path length less than 35 mm will be shown below.

|  | Numerical value example I | II |
| --- | --- | --- |
| Refractive index | 1.7 | 1.75 |
| F-number | 1.22(≈1.2) | 1.24(≈1.2) |
| Size of picture plane | 4.8 × 6.4 | 6.6 × 8.8 |
| Optical path length | 33 (including the thickness of the trimming filter) | 33 (including the thickness of the trimming filter) |
| $\theta_{10}$ | 7° | 5.5° |
| $\theta_{11}$ | 22° | 21.5° |
| $\theta_{10} + \theta_{11}$ | 29° | 27° |
| $\theta_{12}$ | 36° | 35° |

Figure 6:
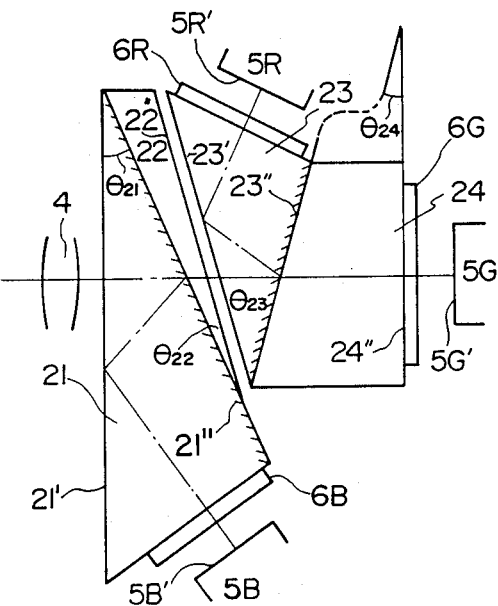
FIG. 6 is a cross-sectional view showing another specific embodiment of the present invention.

Another embodiment of the present invention will now be described by reference to FIG. 6.

The imaged light beam emerging from an objective lens 4 enters a first prism 21 through the entrance surface 21' of a color resolving prism system which is perpendicular to the optic axis, and for example, only the blue range light is reflected by a surface 21" provided with a dichroic film and is further totally reflected by a light entrance surface 21', whereafter the unnecessary wavelength component thereof is cut by a trimming filter 6B, and then the light is imaged on the light-receiving surface 5B' of an image pickup element 5B. The light beam transmitted through the dichroic surface 21" passes through a second prism 22 and further through the exit surface 22" of the second prism into a third prism 23, and for example, only the red range light is reflected by a surface 23" provided with a dichroic film and is further totally reflected by the boundary surface 23' with the air gap provided between the second prism 22 and the third prism 23, and the unnecessary wavelength component is cut by a trimming filter 6R, and then the light beam is imaged on the light-receiving surface 5R', of an image pickup element 5R. The light beam transmitted through the dichroic surface 23", for example, the green light, passes through a prism 24 and exits surface 24" and the unnecessary wavelength component thereof is cut by a trimming filter 6G, and then the light beam is imaged on the light-receiving surface 5G' of an image pickup element 5G.

In this case, due to the above-described construction in which the wedge-shaped second prism 22 is joined and disposed behind the dichroic surface 21" of the first prism 21, total reflection does not occur on the dichroic surface 21". Accordingly, the limitation of the F-number of the color resolving prism comprised of the aforementioned three prism systems, that is, condition (3) of conditions (3) and (4), becomes unnecessary and thus, the refracting angle $\theta_{11}$ may satisfy only one condition $$2\theta_{11} \geq \sin^{-1}(1/n) + \sin^{-1}(1/(2nF_{no})) \quad (4)'''$$

Figure 1:
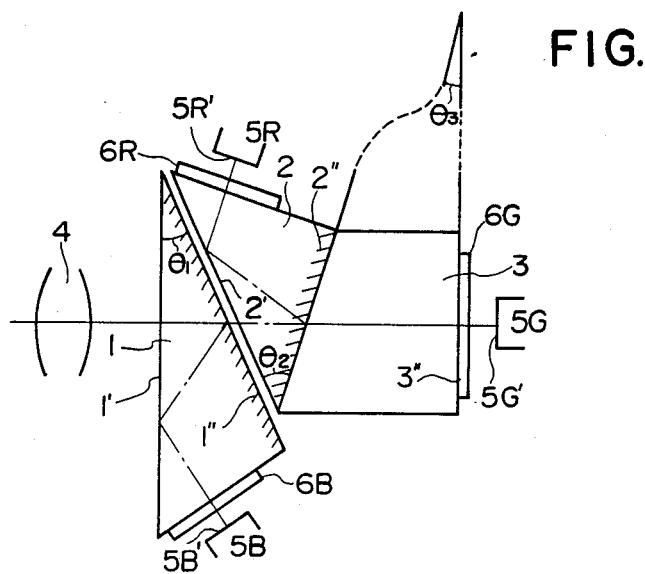
FIG. 1 is a cross-sectional view of a color resolving prism system according to the prior art.
Figure 2:
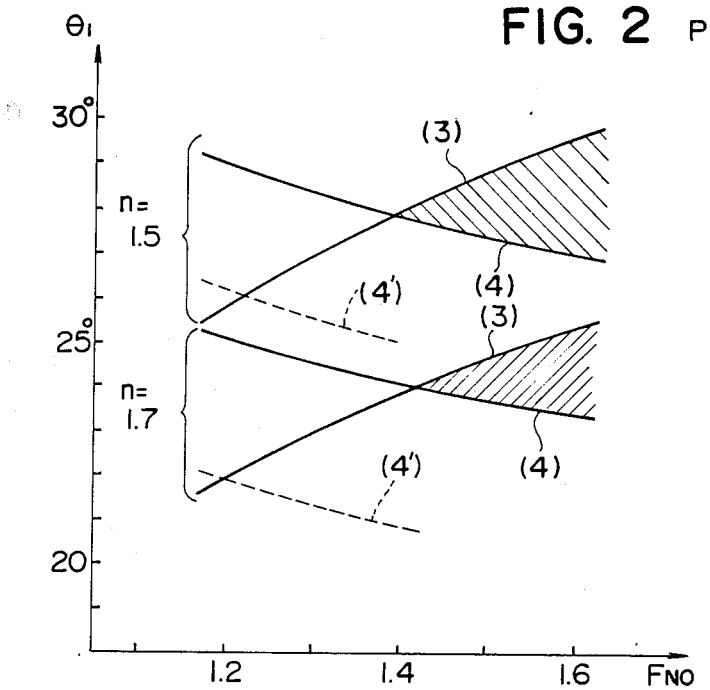
FIG. 2 shows the relation between F-number, the refracting angle of a first prism and the refractive index.

This corresponds to the fact that as shown in FIG. 2, there has been eliminated the condition which determines the upper limit of the refracting angle $\theta_1$, and thus, a color resolving optical system in which an F-number smaller than 1.4 becomes possible.

The conditions which should be satisfied by the refracting angles $\theta_{21}$, $\theta_{22}$, $\theta_{23}$ and $\theta_{24}$ of the prisms in the present construction are as follows:

$$2\theta_{21} \geq \sin^{-1}(1/n) + \sin^{-1}(1/(2nF_{no})) \tag{13}$$

$$\theta_{22} \geq \sin^{-1}(1/n) + \sin^{-1}(1/(2nF_{no})) \tag{14}$$

$$2\theta_{23} \geq \sin^{-1}(1/n) + \sin^{-1}(1/(2nF_{no})) + \theta_{21} - \theta_{22} \tag{15}$$

$$\theta_{24} = -\theta_{21} + \theta_{22} + \theta_{23} \tag{16}$$

Condition (13) is necessary in order that the wavelength range light reflected by the dichroic surface 21" may be totally reflected by the prism system entrance surface 21', condition (14) is necessary in order that the light beam transmitted through the dichroic surface 21" and further passing through the second prism 22 into the air gap from the exit surface 22" of the second prism may not be totally reflected by the exit surface 22", condition (15) is necessary in order that the wavelength range light reflected by the dichroic surface 23" may be totally reflected by the boundary surface 23' with the air gap, and condition (16) is necessary in order that the entrance surface 21' and the exit surface 24" of the prism system may be parallel to each other.

Figure 7:
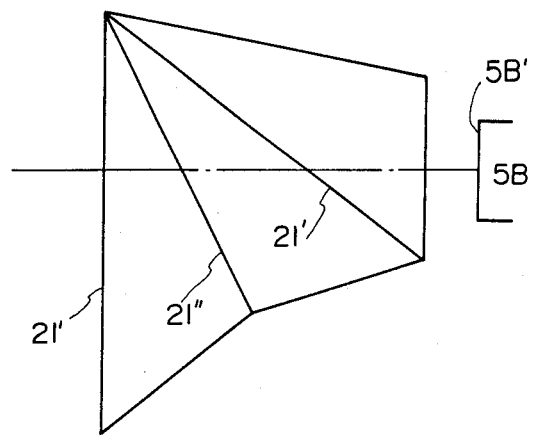
FIGS. 7 and 8 are developed views of an optical member along the optical path.

However, where these conditions are applied to the actual product, further scrutiny is necessary. It has already been described that the regular light beam imaged on the light-receiving surface 5B' of the image pickup element 5B follows the route shown in the developed view of FIG. 7. However, the surface 22" through which all light rays should originally be transmitted has a small reflection factor and therefore, there exists a light ray out of the light beam transmitted through the dichroic surface 21", which is reflected by the surface 22". The light ray reflected by the surface 22" is again transmitted through the dichroic surface 21", is totally reflected by the entrance surface 21' of the prism and arrives at the light-receiving surface 5B'.

Figure 8:
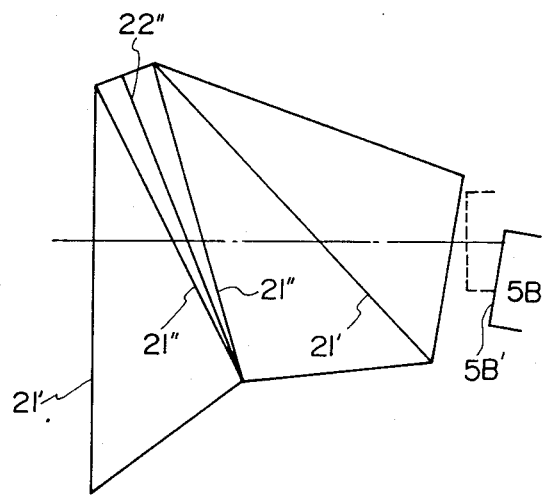

FIG. 8 shows the route of this light ray. In FIG. 9, the dotted line indicates the position of the image pickup element relative to the regular imaged light beam and it is seen that this light ray provides the ghost image in the image pickup element 5B and that this ghost image appears in a substantially focused state. To avoid such a ghost image, it has been found that it is effective to make the refracting angle $\theta_{22}$ of the second prism 22 great and make such a design that the light ray which provides the ghost image does not reach the light-receiving surface 5B' of the image pickup element 5B. However, if $\theta_{22}$ is made too great, the optical path length of the glass of the color resolving prism system will become great and it will become difficult to make the system compact and for this reason, the following condition was set as the range of the angle in which removal of the ghost image and compactness of the system are compatible with each other:

$$13° < \theta_{22} \leq 20° \tag{17}$$

To readily execute the designing of a prism system which is great in numerical aperture and compact, it is desirable to take the following standards into consideration:

$$25.8° - _{21} \leq 30° \tag{18}$$

$$28.1° \leq _{23} \leq 35.4° \tag{19}$$

If the upper limits of conditions (18) and (19) are exceeded, the prism will be liable to become bulky and, if the lower limits of these conditions are exceeded, it will become difficult to realize a prism with a small F-number.

Examples of the numerical values of a color resolving prism system which achieves an F-number of 1.2 and which is made compact will be shown below.

|  | I | II | III |
|---|---|---|---|
| Refractive index of glass material | 1.65 | 1.6 | 1.7 |
| Size of picture plane | 6.6 × 8.8 | 4.8 × 6.4 | 6.6 × 8.8 |
| F-number | 1.2 | 1.2 | 1.2 |
| Optical path length (including the thickness of trimming filter) | 39 | 39 | 35 |
| $\theta_{21}$ | 25.9° | 30° | 26° |
| $\theta_{22}$ | 13.1° | 13.1° | 20° |
| $\theta_{23}$ | 32.5° | 35.4° | 28.1° |
| $\theta_{24}$ | 19.7° | 18.5° | 22.1° |

We claim:

1. A television camera having a color resolving prism system for forming monochromatic images on image pickup surfaces of a plurality of image pickup devices by an objective lens, said color resolving prism system having first, second, third and fourth prisms as is named in the order from a side of the objective lens along the optic axis of said objective lens, said first prism and said second prism being adjacent to each other with an air layer interposed therebetween, said second prism and said third prism being adjacent to each other with an air layer interposed therebetween, a first dichroic layer being formed on a surface of said second prism which faces a surface of said third prism, said third prism and said fourth prism being joined together with a second dichroic layer interposed therebetween, said color resolving prism system satisfying the following conditions:

$$5.2° < \theta_{10} < 12°$$

$$26.7° < \theta_{10} + \theta_{11} < 30°$$

where $\theta_{10}$ and $\theta_{10} + \theta_{11}$ are refracting angles of said first and second prisms, respectively.

2. A television camera according to claim 1, wherein said color resolving prism system furthermore satisfies the following conditions:

$$19° \leq \theta_{11} \leq 22.9°$$

$$33.3° \leq \theta_{12} \leq 37°$$

$$\theta_{13} \leq \theta_{12} - \theta_{11}$$

where $\theta_{12}$ and $\theta_{13}$ are refracting angles of said third and fourth prisms, respectively.

3. A television camera according to claim 1, wherein said color resolving prism system furthermore satisfies the following condition:

$$n \geq 1.7,$$

where n is the refractive index of each of said prisms.

4. A television camera according to claim 1, wherein said color resolving prism system furthermore satisfies the following condition:

$$27° \leq \theta_{10} + \theta_{11} \leq 29°.$$

5. A television camera having a color resolving prism system for forming monochromatic images on image pickup surfaces of a plurality of image pickup devices by an objective lens, said color resolving prism system comprising a first prism, a second prism, a third prism and a fourth prism as is named in the order from a side of the objective lens, said first and second prisms, with their refracting angles opening in opposite directions, being joined together with a first dichroic layer interposed therebetween, said third and fourth prisms, with their refracting angles opening in opposite directions, being joined together with a second dichroic layer interposed therebetween, said second and third prisms being adjacent to each other with an air layer interposed therebetween, said color resolving prism system satisfying the following conditions:

$$25.8° < \theta_{21} \leqq 30°$$

$$13° < \theta_{22} \leqq 20°$$

$$28.1° \leqq \theta_{23} \leqq 35.4°$$

$$\theta_{24} = -\theta_{21} + \theta_{22} + \theta_{23},$$

where $\theta_{21}$, $\theta_{22}$, $\theta_{23}$ and $\theta_{24}$ are refracting angles of said first, second, third and fourth prisms, respectively.

* * * * *

UNITED STATES PATENT AND TRADEMARK OFFICE
CERTIFICATE OF CORRECTION

PATENT NO. : 4,857,997

DATED : August 15, 1989

INVENTOR(S) : Fukami, et al.

It is certified that error appears in the above-identified patent and that said Letters Patent is hereby corrected as shown below:

<u>TITLE PAGE,</u>
<u>[57] ABSTRACT</u>:

Line 4, change "lens" to --lens,--.

Line 9, change "edisposed" to --disposed--.

Line 16, change "$\theta_{21}$)," to --$\theta_{21}$,--.

Line 28, change "$24=-\theta_{21}+\theta_{22}+\theta_{23}$." to

--$\theta_{24}=-\theta_{21}+\theta_{22}+\theta_{23}$.--.

<u>COLUMN 2</u>:

Line 19, change "thrid" to --third--.

Line 26, change "$2\theta_2 \geq 0^1$" to --$2\theta_2 \geq \theta_1$--.

<u>COLUMN 4</u>:

Line 12, change "$-2\theta_{11}+$" to -- $-2\theta_{11}+\alpha$--.

Line 29, change "$\theta$—are" to --$\theta_{13}$ are--.

UNITED STATES PATENT AND TRADEMARK OFFICE
CERTIFICATE OF CORRECTION

PATENT NO. : 4,857,997

DATED : August 15, 1989

INVENTOR(S) : Fukami, et al.

It is certified that error appears in the above-identified patent and that said Letters Patent is hereby corrected as shown below:

COLUMN 7:

Line 36, change "FIG. 9," to --FIG. 8,--.

Line 62, change "$25.8°-_{21} \leq 30°$   (18)" to  --$25.8° < \theta_{21} \leq 30°$   (18)--.

Line 64, change "$28.1° \leq_{23} \leq 35.4°$   (19)" to --$28.1° \leq \theta_{23} \leq 35.4°$   (19)--.

COLUMN 8:

Line 52, change "$\theta_{13} \leq \theta_{12} - \theta_{11}$" to --$\theta_{13} = \theta_{12} - \theta_{11}$--.

Signed and Sealed this

Fourth Day of September, 1990

Attest:

HARRY F. MANBECK, JR.

Attesting Officer

Commissioner of Patents and Trademarks